W. E. ROBERTS.
COMBINATION BABY SEAT AND BED.
APPLICATION FILED SEPT. 29, 1914.
1,200,029.
Patented Oct. 3, 1916.
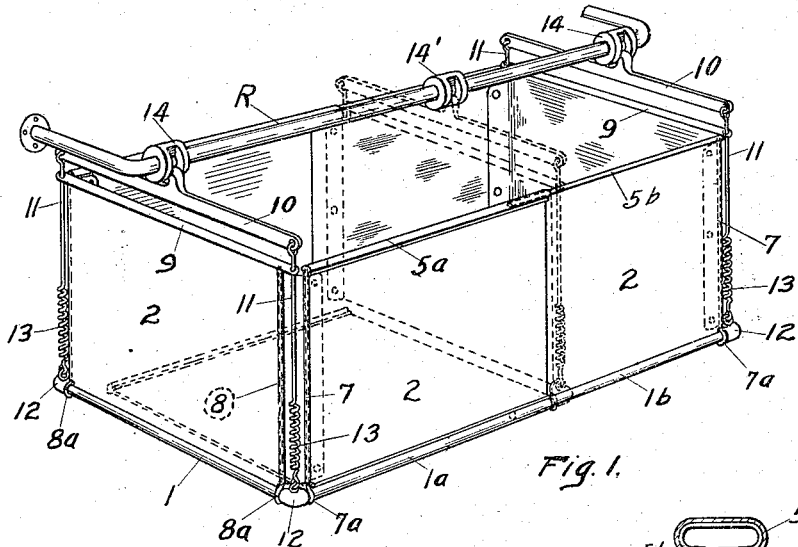
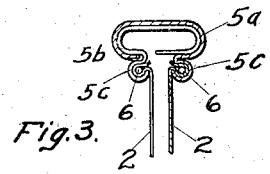
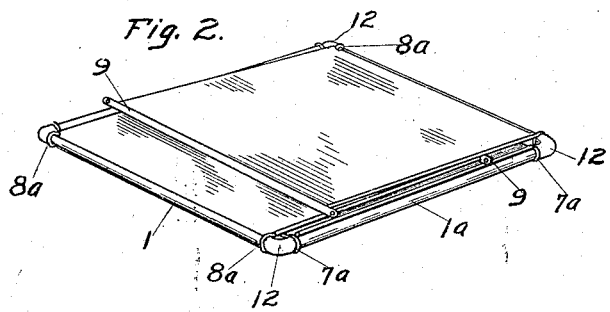
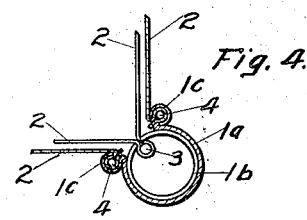
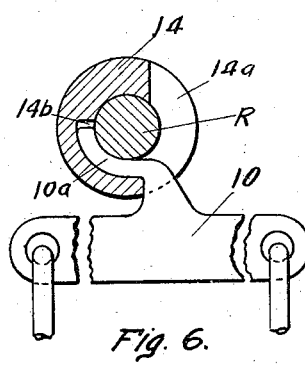
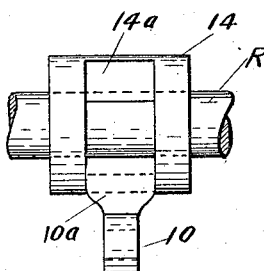
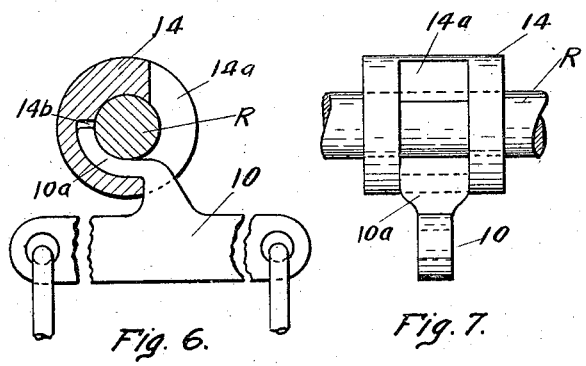
WITNESSES:
F. A. Bullington
J. E. Bullington
INVENTOR
William E. Roberts
BY
ATTORNEY

UNITED STATES PATENT OFFICE.

WILLIAM E. ROBERTS, OF PORTLAND, OREGON.

COMBINATION BABY SEAT AND BED.

1,200,029.  Specification of Letters Patent.  Patented Oct. 3, 1916.

Application filed September 29, 1914. Serial No. 864,152.

*To all whom it may concern:*

Be it known that I, WILLIAM E. ROBERTS, a subject of Great Britain, residing in the city of Portland, county of Multnomah, and State of Oregon, have invented certain new and useful Improvements in Combination Baby Seats and Beds, of which the following is a specification.

My invention relates to a combination baby seat and bed, and more particularly to a device especially adapted for use in an automobile, although it can be used in any place where it can be suspended.

Among the salient objects of the invention are, to provide a device of the character referred to which is collapsible and which can be quickly and conveniently folded into small compass when not in use; to provide a device of the character referred to which can be readily adjusted either for use as a seat, or for use as a bed or crib in which the baby can lie.

Other advantages will be apparent from the following description of one practical embodiment of the invention shown on the accompanying sheet of drawings, and in which,—

Figure 1 is a perspective view of the device open for use as a bed, with a dotted line showing the adjustment for use as a seat; Fig. 2 is a perspective view of the device folded together; Fig. 3 is a fragmentary cross sectional view through the top edge of one of the sides of the device, showing how one member to which fabric is attached telescopes into another member to which fabric is attached; Fig. 4 is a sectional view through the lower side corner telescoping members; Fig. 5 is a fragmentary plan view, with parts in section, of one of the lower corners; Fig. 6 is a sectional view showing how the device can be attached to a robe rail on the back of an automobile seat; and Fig. 7 is a front view thereof.

The sides and bottom of my invention are preferably made of canvas or other suitable fabric. The frame work is made of metal bars and tubular members, and the body of the device, whether used as a seat, or as a bed, is yieldingly suspended by means of springs. In the embodiment of the invention here shown for purposes of illustration, I have provided means for suspending it from the robe rail on the back of the front seat of an automobile, and I will now describe in detail the construction of this embodiment thereof.

The base frame 1 is of rectangular form, with its sides each composed of two members $1^a$ and $1^b$ adapted to telescope one within the other so as to shorten the frame from a bed length to a seat length. In order to adapt these lower side corner members so that they will telescope one within the other and at the same time to make it possible to attach the lower edges of the fabric thereto, I have used tubular members, as $1^a$ and $1^b$, Fig. 4, open lengthwise at one side and provided with means for attaching the fabric thereto. The inner tubular member $1^b$ is slotted sufficiently to allow the fold of the sheet of fabric 2 to be inserted therein, as shown in Fig. 4, with a rod 3 inserted in the corner of the fabric lengthwise of the tubular member $1^b$, as indicated. The outer tubular member $1^a$ is provided along each side of the opening thereto with small bead-like portions, as $1^c$—$1^c$, formed as a part of the member $1^b$, and into which the edges of the outer fabric are placed, around a holding rod or wire, as 4—4, in each, whereby to prevent the fabric from pulling out. Thus it will be seen that the inner tubular member $1^b$ with its fabric 2, can be telescoped within the outer member $1^a$, with the fabric sides moving one within the other in an overlapping manner, as indicated. The top side members are composed of two tubular like members, as $5^a$ and $5^b$, of slightly different construction from the members $1^a$ and $1^b$, but adapted to telescope one within the other, in a similar manner. Their construction is shown in the sectional view in Fig. 3. The outer member $5^a$ is provided along its lower edge with a tubular-like bead $5^c$, adapted to receive the upper edge of the fabric 2, as at $1^c$, with a holding rod or wire 6 therein. The inner member $5^b$ is also provided at its lower edge with a similar holding tubular bead portion $5^c$, adapted to receive the edge of the other fabric wall, which is held therein with a rod or wire, as 6, as before described.

The lower members $1^a$ and $1^b$ are connected, respectively with the upper members $5^a$ and $5^b$, and spaced therefrom, by end rods, as 7—7, provided at their lower ends with eyelets, $7^a$—$7^a$, around the members $1^a$ and 1ᵇ, as indicated. The canvas or fabric 2 at its ends is attached to the rods 7—7, as indicated in Fig. 5. At their upper ends said rods 7—7 are inserted into the open sides of the members 5ᵃ and 5ᵇ.

The end walls of the device are of similar construction without the telescoping feature, having rods 8—8, with eyelets around the lower members 1—1, and with the fabric secured thereto at its sides, with a cross member, as 9, at the top. Supporting members, as 10—10, are provided at the upper opposite ends of the device, and connected at their opposite ends by means of rods, 11—11, extended through the opposite ends of the cross members 9—9, and connected to the elbows 12 of the members 1—1, by means of coiled springs 13—13. As a means for connecting said supporting members 10—10 to the robe rail R on the back of the front seat in an automobile, I have provided a special device, shown in larger detail in Figs. 6 and 7. These devices comprise holding castings 14—14 on said rail R, rigidly secured thereto and cut out on their front sides, as indicated at 14ᵃ, and chambered rearwardly of said rail R, as at 14ᵇ, to receive a curved horn like member 10ᵃ, on the supporting member 10, clearly shown in Fig. 6. By means of these devices the bed is readily attached to and detached from the robe rail R, and is secured thereto in a way that prevents its becoming accidentally detached.

I provide three of the supporting castings 14 on the rail R, the middle one being used when the device is closed up for use as a seat, as indicated in dotted lines in Fig. 1. When so closed up for a seat, the front side is folded down backwardly on to the bottom, as indicated in dotted lines.

When it is desired to fold the device into the smallest compass, the front and back walls are folded downwardly on to the bottom, and the end walls are folded down on top of the side walls, as indicated, Fig. 2.

Thus I have provided a small portable device which can be readily attached to the robe rail on the back seat of an automobile, or other support, and suspended therefrom in a manner to conveniently and comfortably carry a baby, either sitting up, or lying down, and a device which is light and durable.

I am aware that changes can be made in the general details of construction and arrangement without departing from the spirit of the invention, and I do not, therefore, limit the invention to the particular form here shown except as I may be limited by the hereto appended claims.

I claim,—

1. In combination with the robe rail on the back of a vehicle seat, a pair of supporting members slidably and detachably connected with said rail, a box-like body supported at its ends by said supporting members and having bottom and side members adapted to telescope together to shorten said body, said body having one side adapted to be dropped, whereby to convert said body into a seat, substantially as described.

2. In a device of the character referred to, a box-like body having sides and ends adapted to be folded inwardly upon the bottom thereof, said body being adapted to be compressed or extended longitudinally, whereby to form a seat or bed.

3. In combination with a robe rail upon the back of a vehicle seat, a pair of supporting members slidably mounted upon said rail, a pair of supporting arms having hooks detachably secured in said holding members and movable therewith, a box-like body supported at its opposite ends by said supporting arms, and having side and bottom members adapted to be telescoped together to shorten said body, said body having side and end members adapted to be folded together flatwise in collapsed form, substantially as shown and described.

4. In a device of the character referred to a box-like body of rectangular form with open top, composed of two telescoping sections adapted to close together with their sides and bottom in overlapping relationship to shorten said body, its sides and ends all being adapted to fold down on to the bottom thereof, substantially as described.

5. A device of the character referred to comprising a frame structure having side top and bottom members, adapted to telescope one within the other, whereby to shorten the length of said structure, said members being provided with fabric coverings forming the side walls of said structure and said coverings being adapted to move one within the other as said members are telescoped, and said frame structure being foldable into a flat bundle, substantially as described.

6. A device of the character referred to comprising a frame structure whose ends and sides are foldable together in overlying relationship, said side members having top and bottom parts adapted to telescope one within the other, and fabric coverings for said end and side members, substantially as described.

7. A device of the character referred to comprising a frame structure whose ends and sides are foldable together in overlying relationship, and whose side members are adapted to telescope one within the other to shorten said device, and means for yieldingly suspending said device for use, substantially as described.

8. In a foldable device of the character referred to, a frame structure comprising telescoping tubular members both being open along their sides in register with each other, and means for attaching wall members thereto, whereby said wall members telescope one within the other as said tubular members are moved together.

9. In a device of the character referred to, frame members of tubular form adapted to telescope one within the other and open along their sides, means for attaching fabric walls to said tubular members along said openings in angular positions, whereby said walls move in overlapping relationship with each other as said tubular members telescope together.

10. A device of the character referred to comprising in combination a bed or body having side members adapted to be compressed lengthwise whereby to shorten said bed or body, means for suspending said device to a rod comprising a collar-like member secured to said rod and chambered around said rod for a part of its circumference, and a horn upon said device adapted to be inserted in said chamber around said rod, substantially as described.

11. In combination with a supporting rod or bar, a baby holder comprising a rectangular body or bed having side members adapted to telescope one within the other to shorten said body, said side members and the end members of said body being adapted to fold inwardly upon the bottom thereof, supporting members at opposite ends of said body and connected with the bottom part of said body by means of coiled springs, and means for attaching said supporting members to said rod or bar, whereby to yieldingly suspend said body or bed therefrom, substantially as described.

Signed at Portland, Multnomah county, Oregon, this 24th day of September, 1914.

WILLIAM E. ROBERTS.

In presence of—
R. B. FRENCH,
DUDLEY R. CLARKE.

Copies of this patent may be obtained for five cents each, by addressing the "Commissioner of Patents, Washington, D. C."